(12) United States Patent
Matsuki et al.

(10) Patent No.: US 10,494,553 B2
(45) Date of Patent: Dec. 3, 2019

(54) TWO-COMPONENT URETHANE-BASED ADHESIVE COMPOSITION

(71) Applicant: The Yokohama Rubber Co., LTD., Minato-ku, Tokyo (JP)

(72) Inventors: Yuichi Matsuki, Hiratsuka (JP); Megumi Abe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 144 days.

(21) Appl. No.: 15/528,483

(22) PCT Filed: Nov. 19, 2015

(86) PCT No.: PCT/JP2015/082624
§ 371 (c)(1),
(2) Date: May 19, 2017

(87) PCT Pub. No.: WO2016/080508
PCT Pub. Date: May 26, 2016

(65) Prior Publication Data
US 2017/0260434 A1    Sep. 14, 2017

(30) Foreign Application Priority Data
Nov. 19, 2014 (JP) ................................. 2014-234410

(51) Int. Cl.
| C09J 175/04 | (2006.01) |
| C09J 11/06 | (2006.01) |
| C09J 11/08 | (2006.01) |
| C08G 18/79 | (2006.01) |

(52) U.S. Cl.
CPC .......... *C09J 175/04* (2013.01); *C08G 18/792* (2013.01); *C09J 11/06* (2013.01); *C09J 11/08* (2013.01)

(58) Field of Classification Search
CPC .................................................. C08G 18/792
See application file for complete search history.

(56) References Cited

U.S. PATENT DOCUMENTS

| | | | |
|---|---|---|---|
| 6,344,502 B1 * | 2/2002 | Babjak | C08F 283/01 523/201 |
| 2004/0010114 A1 | 1/2004 | Ozawa et al. | |
| 2007/0173348 A1 * | 7/2007 | Rajagopalan | A63B 37/0003 473/351 |
| 2009/0025727 A1 * | 1/2009 | Klun | A61F 9/065 128/206.21 |
| 2010/0137483 A1 * | 6/2010 | Barbeau | C08G 18/0866 524/133 |
| 2010/0203259 A1 * | 8/2010 | Kamitani | C08G 18/6254 427/532 |
| 2011/0065045 A1 * | 3/2011 | Qiu | C08G 18/2845 430/280.1 |
| 2012/0055668 A1 * | 3/2012 | Wu | C08G 18/0823 166/250.01 |
| 2013/0079486 A1 * | 3/2013 | Hidesaki | C07C 263/10 528/65 |
| 2013/0255880 A1 | 10/2013 | Mahdi et al. | |
| 2013/0338330 A1 * | 12/2013 | Nakagawa | C07C 263/10 528/65 |
| 2013/0344340 A1 * | 12/2013 | Senkfor | C08G 18/10 428/419 |
| 2013/0345354 A1 | 12/2013 | Tamogami et al. | |
| 2014/0024781 A1 | 1/2014 | Tamogami et al. | |
| 2015/0005450 A1 | 1/2015 | Matsuki et al. | |

FOREIGN PATENT DOCUMENTS

| | | |
|---|---|---|
| JP | H06-025636 | 2/1994 |
| JP | H11-209585 | 8/1999 |
| JP | 2002-327036 | 11/2002 |
| JP | 2003-171641 | 6/2003 |
| JP | 2005-171033 | 6/2005 |
| JP | 2006-096912 | 4/2006 |
| JP | 2006-111811 | 4/2006 |
| JP | 2006-176664 | 7/2006 |
| JP | 2010-116429 | 5/2010 |
| JP | 2011-162656 | 8/2011 |
| JP | 2012-046613 | 3/2012 |
| JP | 2012-241182 | 12/2012 |
| JP | 2013-194131 | 9/2013 |
| JP | 2013-225636 | 10/2013 |
| JP | 2014-502644 | 2/2014 |
| JP | 2014-198797 | 10/2014 |
| JP | 2014-198804 | 10/2014 |
| WO | WO 2002/070576 | 9/2002 |
| WO | WO 2010/055631 | 5/2010 |
| WO | WO 2012/026486 | 3/2012 |
| WO | WO 2012/078331 | 6/2012 |
| WO | WO-2012121291 A1 * | 9/2012 ........... C07C 263/10 |
| WO | WO 2012/161337 | 11/2012 |
| WO | WO 2013/039081 | 3/2013 |
| WO | WO 2013/141329 | 9/2013 |

OTHER PUBLICATIONS

Machine translation of JP 2003171641. (Year: 2003).*
International Search Report for International Application No. PCT/JP2015/082624 dated Feb. 16, 2016, 4 pages, Japan.
From Adhesion and Coating to Electronic Material, Surface Treatment Technology Handbook, pp. 595-596, Japan.

* cited by examiner

*Primary Examiner* — Michael M Dollinger
(74) *Attorney, Agent, or Firm* — Thorpe North & Western

(57) ABSTRACT

The present technology provides a two-component urethane-based adhesive composition that contains: a main agent containing a urethane prepolymer (A) having an isocyanate group; and a curing agent containing a compound (B) having at least two active hydrogen-containing groups in each molecule. At least one of the main agent or the curing agent contains a compound (C) having an isocyanurate ring, and microparticles (D) containing organic matter and having an average particle diameter of 0.1 to 10 μm; and the compound (C) contains an isocyanurate of pentamethylene diisocyanate.

4 Claims, No Drawings

TWO-COMPONENT URETHANE-BASED ADHESIVE COMPOSITION

TECHNICAL FIELD

The present technology relates to a two-component urethane-based adhesive composition.

BACKGROUND ART

In recent years, resin materials (e.g. olefin-based resins, matrix resins of fiber reinforced plastic (FRP), and the like) have been used for automobile bodies in place of steel plates from the perspective of reducing weight.

Use of one-component moisture-curable urethane composition, as a direct glazing adhesive (hereinafter, also abbreviated as "DG adhesive") used to adhere such a body and window glass of an automobile, has been known.

For example, Japanese Unexamined Patent Application Publication No. 2006-176664A describes "a one-component moisture-curable urethane composition including, per 100 parts by mass of a urethane prepolymer, from 2 to 32 parts by mass of a carbon black (A) having a particle diameter of 20 to 25 nm, and from 8 to 38 parts by mass of a carbon black (B) having a particle diameter of 26 to 30 nm".

Furthermore, Japanese Unexamined Patent Application Publication No. 2014-502644A discloses "in a two-component polyurethane adhesive agent system containing a resin component A and a separately packed curing agent B, the resin component A contains a mixture of monomeric polyisocyanates of aromatic polyisocyanate and aliphatic polyisocyanate (Claim 3). Examples of such an aliphatic polyisocyanate include trimerized hexane-1,6-diisocyanate (paragraph 0021)".

Conventionally known one-component moisture-curable urethane composition, such as those described in Japanese Unexamined Patent Application Publication No. 2006-176664A and the like, had a problem of slow curing speed.

When the inventors of the present technology changed the specification thereof to two-component composition using a main agent and a curing agent from the perspective of enhancing the curing speed, it was found that, as the curing speed increases, adhesion to a base material (especially, a base material formed from an olefin-based resin) may be deteriorated and, depending on the structure of the urethane prepolymer, heat resistance also may be deteriorated.

Furthermore, when the present inventors produced a two-component urethane-based adhesive composition containing a trimerized hexane-1,6-diisocyanate (specifically, an isocyanurate of hexamethylene diisocyanate) as a compound having an isocyanurate ring using Japanese Unexamined Patent Application Publication No. 2014-502644A as a reference, it was found that the viscosity may be increased excessively, thereby causing deterioration in workability.

SUMMARY

The present technology provides a two-component urethane-based adhesive composition that maintains excellent curing speed as a two-component composition and has excellent workability, adhesion, and heat resistance.

The inventors of the present technology found that, by blending a compound having an isocyanurate ring and microparticles containing organic matter and having a predetermined particle diameter into at least one of the main agent or the curing agent, excellent curing speed as a two-component composition is maintained, and excellent workability, adhesion, and heat resistance are achieved.

Specifically, the inventors discovered a two-component urethane-based adhesive composition having the following configuration.

[1]

A two-component urethane-based adhesive composition containing:

a main agent containing a urethane prepolymer (A) having an isocyanate group; and a curing agent containing a compound (B) having at least two active hydrogen-containing groups in each molecule;

at least one of the main agent or the curing agent containing a compound (C) having an isocyanurate ring, and microparticles (D) containing organic matter and having an average particle diameter of 0.1 to 10 μm; and the compound (C) containing an isocyanurate of pentamethylene diisocyanate.

[2]

The two-component urethane-based adhesive composition according to [1] above, where the microparticles (D) are polymers (D1) of a polymeric unsaturated group-containing monomer dispersed in a polyoxyalkylene polyol.

[3]

The two-component urethane-based adhesive composition according to [2] above, where the glass transition temperature of the polymer (D1) is 60° C. or higher.

[4]

The two-component urethane-based adhesive composition according to any one of [1] to [3] above, where at least one of the main agent or the curing agent further contains a terpene compound (E).

As described below, according to the present technology, a two-component urethane-based adhesive composition that maintains excellent curing speed as a two-component composition and has good workability, adhesion, and heat resistance can be provided.

DETAILED DESCRIPTION

The two-component urethane-based adhesive composition of the present technology (hereinafter, also simply abbreviated as "adhesive composition of the present technology") is a two-component urethane-based adhesive composition containing: a main agent containing a urethane prepolymer (A) having an isocyanate group; and a curing agent containing a compound (B) having at least two active hydrogen-containing groups in each molecule; at least one of the main agent or the curing agent containing a compound (C) having an isocyanurate ring, and microparticles (D) containing organic matter and having an average particle diameter of 0.1 to 10 μm; and the compound (C) containing an isocyanurate of pentamethylene diisocyanate.

In the present technology, as described above, by blending a compound (C) having an isocyanurate ring and microparticles (D) containing organic matter and having an average particle diameter of 0.1 to 10 μm into at least one of the main agent or the curing agent, excellent curing speed as a two-component composition is maintained, and excellent adhesion and heat resistance are achieved.

Although details are not clearly known, it is conceived that a resin backbone (an isocyanurate ring derived from the compound (C)) having high heat resistance is incorporated into a crosslinking network after the curing reaction and the microparticles (D) are present in the crosslinking network, thereby appropriately restricting thermal mobility in a high temperature environment. As a result, stress applied to the adhesion interface can be reduced compared to the case where the compound (C) and/or the microparticles (D) are not present.

Therefore, the adhesive composition of the present technology is also useful as an adhesive composition for olefin base materials.

Furthermore, in the present technology, as described above, by allowing the compound (C) having an isocyanurate ring to contain an isocyanurate of pentamethylene diisocyanate, increase in viscosity of the main agent or the curing agent that contains the isocyanurate of pentamethylene diisocyanate can be suppressed. It is presumed that the isocyanurate of pentamethylene diisocyanate exhibits excellent effect of suppressing viscosity among compound systems to which isocyanurate compounds are added since the isocyanurate of pentamethylene diisocyanate has a smaller molecular weight and lower viscosity compared to those of other isocyanurate compounds (especially, an isocyanurate of hexamethylene diisocyanate). This is also shown in "Examples" section described below. Specifically, the viscosity of the main agent of Example 1 which used an isocyanurate of pentamethylene diisocyanate was significantly reduced compared to the viscosity of the main agent of Comparative Example 2 which used an isocyanurate of hexamethylene diisocyanate. By suppressing the increase in viscosity of the main agent or the curing agent as described above, an advantage exists in that excellent workability is achieved during preparation or use of the adhesive composition.

Main Agent

The main agent of the adhesive composition of the present technology contains a urethane prepolymer (A) having an isocyanate group.

Urethane Prepolymer (A)

A urethane prepolymer (A) contained in the main agent of the adhesive composition of the present technology is a polymer containing a plurality of isocyanate groups at molecular terminals in a molecule.

A conventionally known urethane prepolymer can be used as the urethane prepolymer (A). For example, a reaction product, obtained by reacting a polyisocyanate compound with a compound having at least two active hydrogen groups in each molecule (hereinafter, abbreviated as "active hydrogen compound") in a manner that the amount of the isocyanate group is in excess relative to the amount of the active hydrogen groups, or the like can be used.

Polyisocyanate Compound

The polyisocyanate compound used upon producing the urethane prepolymer (A) is not particularly limited as long as the polyisocyanate compound has two or more isocyanate groups in a molecule.

Specific examples of isocyanate used in the polyisocyanate compound include aromatic polyisocyanates, such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates, such as hexamethylene diisocyanate (HDI), trimethylhexamethylene diisocyanate (TMHDI), lysine diisocyanate, and norbornane diisocyanate (NBDI); alicyclic polyisocyanates, such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; isocyanurate-modified polyisocyanates thereof; and the like.

Such a polyisocyanate compound may be used alone, or a combination of two or more types of these polyisocyanate compounds may be used.

Among these, MDI is preferred from the perspective of excellent curability.

Active Hydrogen Compound

The active hydrogen compound having at least two active hydrogen groups in a molecule used upon producing the urethane prepolymer (A) is not particularly limited.

Preferred examples of the active hydrogen compound include polyol compounds having two or more hydroxy (OH) groups in one molecule, polyamine compounds having two or more amino groups and/or imino groups in one molecule, and the like. Among these, a polyol compound is preferable.

The polyol compound is not particularly limited with respect to its molecular weight, backbone, and the like as long as the polyol compound is a compound having two or more OH groups, and specific examples thereof include low molecular weight polyhydric alcohols, polyether polyols, polyester polyols, other types of polyols, polyol mixtures thereof, and the like.

Specific examples of the low molecular weight polyhydric alcohols include low molecular weight polyols, such as ethylene glycol (EG), diethylene glycol, propylene glycol (PG), dipropylene glycol, (1,3- or 1,4-) butanediol, pentanediol, neopentyl glycol, hexanediol, cyclohexanedimethanol, glycerin, 1,1,1-trimethylolpropane (TMP), 1,2,5-hexanetriol, and pentaerythritol; sugars, such as sorbitol; and the like.

As the polyether polyols and polyester polyols, compounds derived from the low molecular weight polyhydric alcohols are typically used; however, in the present technology, compounds derived from aromatic diols, amines, and alkanolamines described below may also be suitably used.

Note that specific examples of the aromatic diol include resorcin (m-dihydroxybenzene), xylylene glycol, 1,4-benzene dimethanol, styrene glycol, 4,4'-dihydroxyethyl phenol; and compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, and a bisphenol AF structure represented below.

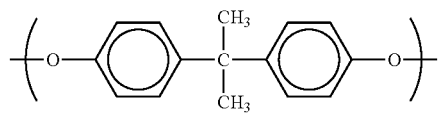

BISPHENOL A STRUCTURE

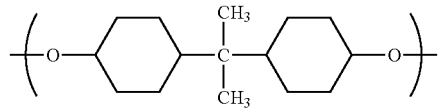

HYDROGENATED BISPHENOL A STRUCTURE

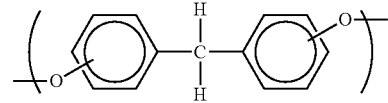

BISPHENOL F STRUCTURE

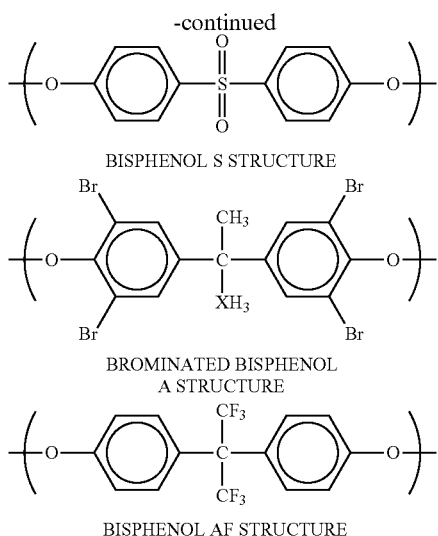

BISPHENOL S STRUCTURE

BROMINATED BISPHENOL A STRUCTURE

BISPHENOL AF STRUCTURE

Furthermore, specific examples of the amines include ethylenediamine, hexamethylenediamine, and the like. Specific examples of the alkanolamines include ethanolamine, propanolamine, and the like.

Examples of the polyether polyols include polyols obtained by adding at least one type selected from the group consisting of styrene oxide and alkylene oxides, such as ethylene oxide, propylene oxide, butylene oxide (tetramethylene oxide), and tetrahydrofuran, or the like, to at least one type selected from the group consisting of the compounds that are exemplified as the low molecular weight polyhydric alcohols, the aromatic diols, the amines, and the alkanolamines described above; and the like.

Specific examples of the polyether polyol include polyethylene glycol, polypropylene glycol (PPG), polypropylene triol, ethylene oxide/propylene oxide copolymers, polytetramethylene ether glycol (PTMEG), polytetraethylene glycol, and sorbitol polyol.

Likewise, examples of the polyester polyol include condensation products (condensed polyester polyols) of any of the low molecular weight polyhydric alcohols, the aromatic diols, the amines, or the alkanolamines with a polybasic carboxylic acid; lactone polyols; polycarbonate polyols; and the like.

Specific examples of the polybasic carboxylic acid constituting the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low molecular weight carboxylic acid, oligomeric acid, castor oil, hydroxycarboxylic acid, such as a reaction product of castor oil and ethylene glycol (or propylene glycol), and the like.

In addition, specific examples of the lactone polyols include compounds that are obtained by ring-opening polymerization of a lactone, such as ε-caprolactone, α-methyl-ε-caprolactone, or ε-methyl-ε-caprolactone with a suitable polymerization initiator, and that have hydroxy groups at both ends.

Specific examples of other polyol include acrylic polyol; polybutadiene diol; polymeric polyol having carbon-carbon bonds on the main chain skeleton, such as hydrogenated polybutadiene polyol; and the like.

In the present technology, the various polyol compounds exemplified above may be used alone or may be used in a combination of two or more types.

Among these, the polyol compound is preferably polypropylene glycol from the perspectives of achieving excellent balance of hardness and breaking elongation of the adhesive composition of the present technology containing the resulting urethane prepolymer in a main agent as well as achieving excellent cost effectiveness.

Specific examples of the polyamine compound include aliphatic polyamines, such as ethylenediamine, propylenediamine, butylenediamine, diethylenetriamine, triethylentetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, manufactured by DuPont K.K.); aromatic polyamines, such as meta-phenylenediamine, ortho-phenylenediamine, para-phenylenediamine, m-xylenediamine (MXDA), diaminodiphenyl methane, diaminodiphenyl sulfone, and diamino diethyldiphenylmethane; N-aminoethylpiperazine; monoamine having an ether bond in the main chain, such as 3-butoxyisopropylamine; diamines having a polyether backbone, that is exemplified by JEFFAMINE EDR148 manufactured by Sun Techno Chemicals Co., Ltd.; alicyclic polyamines, such as isophoronediamine, 1,3-bisaminomethylcyclohexane (1,3BAC, manufactured by Mitsubishi Gas Chemical Company, Inc.), 1-cyclohexylamino-3-aminopropane, and 3-aminomethyl-3,3,5-trimethyl-cyclohexylamine; diamines having a norbornane skeleton, such as norbornanediamine (NBDA, manufactured by Mitsui Chemicals, Inc.); polyamide amines having an amino group at a molecular terminal of polyamide; 2,5-dimethyl-2,5-hexamethylene diamine, menthenediamine, 1,4-bis(2-amino-2-methylpropyl)piperazine, JEFFAMINE D230 and JEFFAMINE D400, manufactured by Sun Techno Chemicals Co., Ltd., having polypropylene glycol (PPG) as a backbone; and the like. These polyamine compounds may be used alone or may be used in a combination of two or more types.

Among these, diamine having a polyether backbone (JEFFAMINE) and hexamethylene diamine are preferable.

In the present technology, the urethane prepolymer (A) is preferably a urethane prepolymer obtained by using an aromatic polyisocyanate as a polyisocyanate compound and a polyether polyol having a molecular weight of 500 to 20000 as an active hydrogen compound, and reacting these in a manner that the amount of the isocyanate group of the aromatic polyisocyanate relative to 1 mol of hydroxy group of the polyether polyol is from 1.5 to 2.5 mol.

Curing Agent

The curing agent of the adhesive composition of the present technology contains a compound (B) having two or more active hydrogen groups in each molecule.

Compound (B)

The compound (B) contained in the curing agent of the adhesive composition of the present technology is a component that cures the urethane prepolymer contained in the main agent described above (curing agent component in a narrow sense).

In the present technology, examples of the compound (B) include the same compounds as those exemplified as the active hydrogen compound used during the production of the urethane prepolymer (A). Among these, a polyol compound is preferred.

As the polyol compound, from the perspective of achieving even better adhesion to resin base materials and/or even better heat resistance, use of a tri- or lower functional polyether polyol (B1) (hereinafter, also simply referred to as "polyether polyol (B1)"), a polyol compound (B2) having a hydrophobic backbone, rosin diol (B3), a tetra- or higher functional polyether polyol (B4) (hereinafter, also simply referred to as "polyether polyol (B4)"), or the like is preferred.

The polyether polyol (B1) is tri- or lower functional as described above, but is preferably from bifunctional to trifunctional, and more preferably trifunctional. Note that bi- or higher functional polyether polyol is not limited to these, and for example, the bi- or higher functional polyether polyol can be produced by addition of polymerizing ethylene oxide or propylene oxide to a di- or higher valent polyhydric alcohol (such as glycerin and trimethylolpropane) as an initiator in the presence of a basic catalyst.

As the polyether polyol constituting the polyether polyol (B1), for example, polyether polyols exemplified in the section of "Main agent" described above can be used and, among these, polypropylene glycol is preferably used.

As the polyether polyol (B1), commercially available products can be also used, and examples thereof include Excenol 1030 (manufactured by Asahi Glass Co., Ltd.; trifunctional polypropylene glycol) and the like.

Examples of the polyol compound (B2) having a hydrophobic backbone include diol compounds in which the main backbone is hydrophobic, such as polybutadiene diol and hydrogenated polybutadiene diol, and a polybutadiene diol is preferably used.

Examples of the polybutadiene diol include a substance in which a terminal of a butadiene polymer, such as a butadiene homopolymer, an isoprene homopolymer, a butadiene-styrene copolymer, a butadiene-isoprene copolymer, a butadiene-acrylonitrile copolymer, a butadiene-2-ethylhexylacrylate copolymer, or a butadiene-n-octadecylacrylate copolymer, is modified with a hydroxy group, and the like.

A commercially available product can be used as the polyol compound (B2) having a hydrophobic backbone, and examples thereof include Poly bd R-45 HT (manufactured by Idemitsu Kosan Co., Ltd.; polybutadiene diol) and the like.

The rosin diol (B3) is a compound having a rosin skeleton and two hydroxy groups in a molecule. Examples of the rosin diol (B3) include rosin esters obtained by reacting rosin and a polyhydric alcohol, reaction products of rosin and bisphenol A diglycidyl ether or the like, and the like.

Examples of commercially available products of the rosin diol include Pinecrystal D-6011 (manufactured by Arakawa Chemical Industries, Ltd.) and the like.

The polyether polyol (B4) is tetra- or higher functional as described above, but is preferably from tetrafunctional to hexafunctional, and more preferably tetrafunctional.

As the polyether polyol constituting the polyether polyol (B4), for example, polyether polyols exemplified in the section of "Main agent" described above can be used.

As the polyether polyol (B4), commercially available products can be also used, and examples thereof include Polyol 4800 (manufactured by Perstorp; tetrafunctional polyether polyol) and the like.

The compound (B) preferably at least contains the polyether polyol (B1) described above. Furthermore, in addition to the polyether polyol (B1) described above, at least one type selected from the group consisting of the polyol compound (B2) having a hydrophobic backbone, the rosin diol (B3), and the polyether polyol (B4) is more preferably contained.

In the present technology, the compounding ratio of the main agent to the curing agent in the adhesive composition of the present technology is preferably an amount such that the molar ratio of the isocyanate group in the main agent to the active hydrogen group in the curing agent (NCO/OH) is from 0.5 to 10.0, and more preferably from 1.0 to 4.0.

Compound (C) having Isocyanurate Ring

In the adhesive composition of the present technology, at least one of the main agent or the curing agent described above contains a compound (C) having an isocyanurate ring.

Note that the compound (C) is, independent of the microparticles (D) described below, contained in at least one of the main agent or the curing agent described above and may be contained in both of the main agent and the curing agent.

In the present technology, the compound (C) at least contains an isocyanurate of pentamethylene diisocyanate.

Furthermore, as long as the effect of the present technology is sufficiently exhibited, the compound (C) may further contain another compound other than the isocyanurate of pentamethylene diisocyanate. Examples of such a compound include at least one type of compound selected from the group consisting of an isocyanurate compound of aliphatic diisocyanate (C1) (except the isocyanurate of pentamethylene diisocyanate), an isocyanurate compound of aliphatic isocyanate silane (C2), a (meth)acrylate compound having an isocyanurate ring (C3), a thiol compound having an isocyanurate ring (C4), and a glycidyl compound having an isocyanurate ring (C5).

Note that "(meth)acrylate compound" refers to a compound having an acryloyloxy group or a methacryloyloxy group, and "(meth)acryloyloxy group" described below refers to an acryloyloxy group or a methacryloyloxy group.

Isocyanurate of Pentamethylene Diisocyanate

The isocyanurate of pentamethylene diisocyanate (hereinafter, also referred to as "compound (C1-2)") is a compound represented by Formula (C1-2) below. By using the compound (C1-2), increase in the viscosity of the main agent or the curing agent containing this can be suppressed. The compound (C1-2) is preferably contained in the main agent.

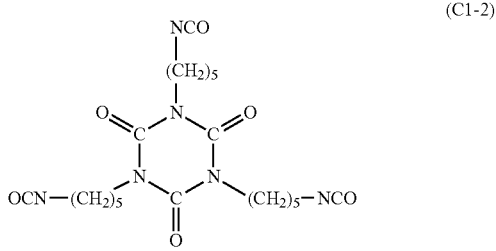

(C1-2)

In the present technology, when the compound (C1-2) is compounded in the main agent, the content of the compound (C1-2) is preferably from 0.1 to 10 mass %, and more preferably from 0.3 to 2.5 mass %, relative to the total mass of the main agent. Furthermore, when the compound (C1-2) is compounded in the curing agent, the content of the compound (C1-2) is preferably from 0.3 to 20 mass %, and more preferably from 0.5 to 5 mass %, relative to the total mass of the curing agent.

Isocyanurate Compound (C1)

The isocyanurate compound (C1) is a compound except the isocyanurate of pentamethylene diisocyanate, and examples thereof include isocyanurates of aliphatic diisocyanate, such as hexamethylene diisocyanate (HDI), trimethylhexamethylene diisocyanate (TMHDI), lysine diisocyanate, and norbornane diisocyanate (NBDI).

The isocyanurate of HDI is, specifically, a compound represented by Formula (C1-1) below.

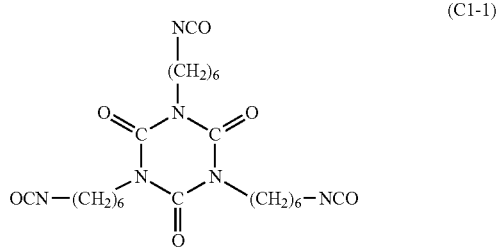

(C1-1)

Isocyanurate Compound (C2)

The isocyanurate compound (C2) is an isocyanurate compound of aliphatic isocyanate silane.

Note that the aliphatic isocyanate silane is a compound having a hydrolyzable silicon-containing group and an isocyanate group derived from an aliphatic compound and, for example, can be obtained by reacting an isocyanate group-containing aliphatic compound with a compound having a functional group being able to react with the isocyanate group and a hydrolyzable silicon-containing group.

Specifically, preferable examples of the isocyanurate compound (C2) include a compound obtained by forming an isocyanurate from an aliphatic isocyanate silane, such as isocyanatopropyltriethoxysilane and isocyanatopropyltrimethoxysilane.

(Meth)acrylate Compound (C3)

The (meth)acrylate compound (C3) is not particularly limited as long as the (meth)acrylate compound (C3) is a compound having an isocyanurate ring and a (meth)acryloyloxy group.

Specific examples of the (meth)acrylate compound (C3) include ethoxylated isocyanuric acid triacrylate and ε-caprolactone-modified tris(2-acryloxyethyl)isocyanurate; compounds obtained by reacting aliphatic diisocyanate, such as hexamethylene diisocyanate (HDI), pentamethylene diisocyanate, trimethylhexamethylene diisocyanate (TMHDI), lysine diisocyanate, and norbornane diisocyanate (NBDI), with a hydroxy group-containing acrylamide monomer, such as hydroxyethyl acrylamide, and/or a hydroxy group-containing acrylate, such as 4-hydroxybutylacrylate; and the like.

Thiol Compound (C4)

The thiol compound (C4) is not particularly limited as long as the thiol compound (C4) is a compound having an isocyanurate ring and a mercapto group.

Specific examples of the thiol compound (C4) include tris(ethyl-3-mercaptopropionate)isocyanurate, 1,3,5-tris(3-mercaptobutylyloxyehtyl)-1,3,5-triazine-2,4,6(1H,3H,5H)-trione, and the like.

Glycidyl Compound (C5)

The glycidyl compound (C5) is not particularly limited as long as the glycidyl compound (C5) is a compound having an isocyanurate ring and an epoxy group.

Specific examples of the glycidyl compound (C5) include 1,3,5-tris(2,3-epoxypropyl)-1,3,5-triazine-2,4,6(1H,3H, 5H)-trione, and the like.

In the present technology, when the compound (C) is compounded in the main agent, the content of the compound (C) is preferably from 0.1 to 10 mass %, and more preferably from 0.3 to 2.5 mass %, relative to the total mass of the main agent. Furthermore, when the compound (C) is compounded in the curing agent, the content of the compound (C) is preferably from 0.3 to 20 mass %, and more preferably from 0.5 to 5 mass %, relative to the total mass of the curing agent. Microparticles (D) containing organic matter and having average particle diameter of 0.1 to 10 μm.

The adhesive composition of the present technology contains microparticles (D) containing organic matter and having an average particle diameter of 0.1 to 10 μm in at least one of the main agent or the curing agent described above.

Note that the microparticles (D) are, independent of the compound (C) described above, contained in at least one of the main agent or the curing agent described above and may be contained in both of the main agent and the curing agent.

Furthermore, "average particle diameter" refers to an average value of the particle diameters of the microparticles (D) and refers to 50 vol. % cumulative diameter (D50) measured using a laser diffraction particle size distribution measurement device. Note that, when the cross section of the microparticle (D) is an ellipse, the particle diameter, which are used as the basis of the average value calculation, is an average value obtained by dividing the sum of the major axis and the minor axis thereof by 2. When the cross section is a circle, the particle diameter is the diameter thereof.

The average particle diameter of the microparticles (D) is preferably from 0.2 to 7 μm, and more preferably from 0.3 to 5 μm.

Polymer (D1)

In the present technology, from the perspective of dispersibility in a resin matrix containing the urethane prepolymer (A) and the compound (B) described above, the organic matter constituting the microparticles (D) is preferably a polymer (D1) of a polymeric unsaturated group-containing monomer, and more preferably the polymer (D1) dispersed in a polyoxyalkylene polyol.

Note that examples of the polymeric unsaturated group include polymeric functional groups, such as a (meth)acryloyloxy group, a vinyl group, an allyl group, and a styryl group.

As the monomers having such a polymeric unsaturated group, conventionally known crosslinking monomers can be used, and examples thereof include alkyl methacrylates, such as methyl methacrylate (MMA), ethyl methacrylate, and butyl methacrylate; alkyl acrylates, such as ethyl acrylate and butyl acrylate; aromatic vinyls and aromatic vinylidenes, such as styrene, vinyl toluene, and α-methyl styrene; vinyl cyanides and vinylidene cyanides, such as acrylonitrile and methacrylonitrile; and the like. The polymer (D1) may be a homopolymer of these monomers or may be a copolymer of these monomers.

Among these, the polymer (D1) is preferably a homopolymer of MMA, a copolymer of acrylonitrile and styrene, or a homopolymer of styrene.

Examples of the method of preparing the polymer (D1) include methods using suspension polymerization and the like. Specifically, examples thereof include techniques in which, after monomers are polymerized in a solvent such as water to form particles, the solvent is reduced to collect only the particles. More specifically, examples thereof include methods described in Japanese Unexamined Patent Application Publication No. 2014-198797A, Japanese Unexamined Patent Application Publication No. 2014-198804A, and the like.

Furthermore, the method of preparing the polymer (D1) dispersed in a polyoxyalkylene polyol include a method of using so-called polymeric polyol, and the like. Specific examples thereof include a method of preparing a micronized polymer (D1) in a polymer solution by using a polypropylene glycol (PPG) having low volatility as a solvent and by polymerizing a monomer in the solvent (polymer solution). More specifically, examples thereof include methods described in examples of Japanese Unexamined Patent Application Publication No. 2012-241182A and Japanese Unexamined Patent Application Publication No. 2012-46613A.

In the present technology, when the polymer (D1) dispersed in a polyoxyalkylene polyol is used as the microparticles (D) and when this is compounded in the main agent, the polyoxyalkylene polyol may be used as a part of an active hydrogen compound to produce the urethane prepolymer (A) described above.

Similarly, when the polymer (D1) dispersed in a polyoxyalkylene polyol is used as the microparticles (D) and when this is compounded in the curing agent, the polyoxyalkylene polyol may be used (reused) as a part of the compound (B) having two or more active hydrogen-containing groups in each molecule.

In the present technology, from the perspectives of achieving even better heat resistance and enhancing chemical resistance, the glass transition temperature of the polymer (D1) is preferably 60° C. or higher, and more preferably from 80 to 250° C.

Note that the glass transition temperature (Tg) is measured at a rate of temperature increase of 20° C./min using a differential scanning calorimeter (DSC) and calculated by the midpoint method.

In the present technology, the organic matter constituting the microparticles (D) may be a melamine-based resin besides the polymer (D1) described above.

Examples of the microparticles (D) containing a melamine-based resin as the organic matter include spherical composite cured melamine resins described in Japanese Unexamined Patent Application Publication No. 2002-327036A, Japanese Unexamined Patent Application Publication No. 2005-171033A, and the like.

In the present technology, when the microparticles (D) are compounded in the main agent, the content of the microparticles (D) is preferably from 0.1 to 30 mass %, and more preferably from 0.5 to 20 mass %, relative to the total mass of the main agent. Furthermore, when the microparticles (D) are compounded in the curing agent, the content of the microparticles (D) is preferably from 0.5 to 50 mass %, and more preferably from 1 to 15 mass %, relative to the total mass of the curing agent.

Terpene Compound

In the adhesive composition of the present technology, at least one of the main agent or the curing agent described above preferably contains a terpene compound.

Examples of the terpene compound include at least one type of terpene compound selected from the group consisting of monoterpene, hydrogenated monoterpene, modified monoterpene in which the monoterpene or the hydrogenated monoterpene is modified with a hydroxy group, and oligomers having two to six repeating units derived from the monoterpene or the modified monoterpene.

Note that "terpene" is a series of compounds based on the isoprene rule, i.e. a generic name of compounds represented by molecular formula $(C_5H_8)n$. Among these, "monoterpene" refers to a compound represented by molecular formula $(C_5H_8)_2$. Furthermore, "oligomer having two to six repeating units derived from the monoterpene or the modified monoterpene" refers to a compound having a monoterpene skeleton and two to six repeating units represented by molecular formula $(C_5H_8)_2$, and the oligomer having two to six repeating units derived from the monoterpene or the modified monoterpene may be a homopolymer (homooligomer) or a copolymer (cooligomer).

Monoterpene

Examples of the monoterpene include compounds represented by Formula (1) below (α-pinene), compounds represented by Formula (2) below (β-pinene), compounds represented by Formula (3) below (limonene), myrcene, carvone, camphor, and the like. One type of these may be used alone or two or more types of these may be used in combination.

Among these, the compounds represented by Formulas (1) to (3) below are preferred.

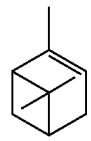

(1)

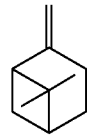

(2)

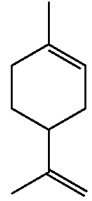

(3)

Hydrogenated Monoterpene

The hydrogenated monoterpene is a terpene compound formed by subjecting the monoterpene described above to hydrogenation.

Examples of the hydrogenated monoterpene include compounds (p-menthane) represented by Formula (4) below, and the like.

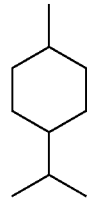

(4)

Modified Monoterpene

The modified monoterpene is a monoterpene formed by modifying the monoterpene or the hydrogenated monoterpene described above by a hydroxy group.

Examples of the modified monoterpene include compounds represented by Formula (5) below (α-terpineol), compounds represented by Formula (6) below (β-terpineol), compounds represented by Formula (7) below (γ-terpene), and the like. One type of these may be used alone or two or more types of these may be used in combination.

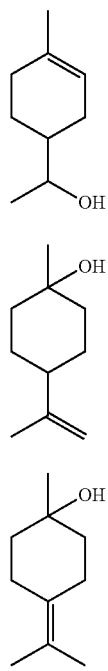

(5)

(6)

(7)

Oligomer

The oligomer is a compound having two to six repeating units derived from the monoterpene or the modified monoterpene described above (except the modified monoterpene in which the hydrogenated monoterpene is modified with a hydroxy group.

Examples of the oligomer include compounds represented by Formula (8) below (terpene resin), compounds represented by Formula (9) below (aromatic modified terpene resin), compounds represented by Formula (10) below (terpene phenol resin), and the like. One type of these may be used alone or two or more types of these may be used in combination.

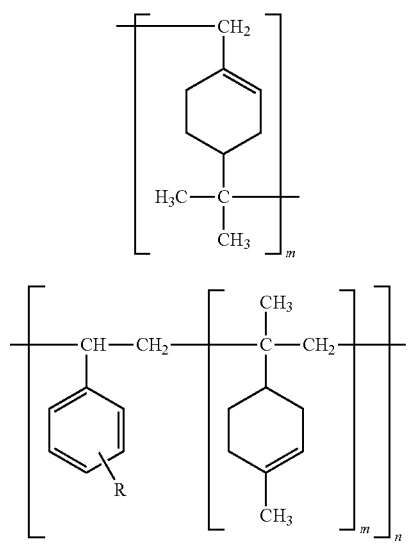

(8)

(9)

(10)

Note that, in Formulas (8) to (10), m is a number from 2 to 6, n is a number from 1 to 3, and m×n is a number from 2 to 6.

Furthermore, m and m×n are preferably numbers of 2 to 5, and more preferably 2 to 3.

On the other hand, in Formula (9) above, R represents a hydrogen atom or an alkyl group having from 1 to 12 carbons.

Furthermore, R is preferably a hydrogen atom or an alkyl group having from 1 to 4 carbons, and more preferably a hydrogen atom.

In the present technology, when the terpene compound is compounded in the main agent, the content of the terpene compound is preferably from 0.05 to 25 mass %, and more preferably from 0.2 to 10 mass %, relative to the total mass of the main agent. Furthermore, when the terpene compound is compounded in the curing agent, the content of the terpene compound is preferably from 0.05 to 30 mass %, and more preferably from 1 to 20 mass %, relative to the total mass of the curing agent.

Carbon Black

In the adhesive composition of the present technology, at least one of the main agent or the curing agent described above preferably contains a carbon black.

The carbon black can be a conventionally known carbon black that is also used in a typical one-component polyurethane composition.

Examples of the carbon black include Super Abrasion Furnace (SAF), Intermediate Super Abrasion Furnace (ISAF), High Abrasion Furnace (HAF), Fast Extruding Furnace (FEF), General Purpose Furnace (GPF), Semi-Reinforcing Furnace (SRF), Fine Thermal (FT), Medium Thermal (MT), and the like.

Specifically, SEAST 9 (manufactured by Tokai Carbon Co., Ltd.) as the SAF, Showa Black N 220 (manufactured by Showa Cabot K.K.) as the ISAF, SEAST 3 (manufactured by Tokai Carbon Co., Ltd.) as the HAF, HTC #100 (manufactured by Chubu Carbon K.K.) as the FEF, and the like are exemplified. Furthermore, Asahi #55 (manufactured by Asahi Carbon Co., Ltd.) and SEAST 5 (manufactured by Tokai Carbon Co., Ltd.) as the GPF, Asahi #50 (manufactured by Asahi Carbon Co., Ltd.) and Mitsubishi #5 (manufactured by Mitsubishi Chemical Corporation) as the SRF, Asahi Thermal (manufactured by Asahi Carbon Co., Ltd.) and HTC #20 (manufactured by Chubu Carbon K.K.) as the FT, Asahi #15 (manufactured by Asahi Carbon Co., Ltd.) as the MT, and the like are exemplified.

In the present technology, when the carbon black is compounded in the main agent, the content of the carbon black is preferably from 5 to 70 mass %, and more preferably from 10 to 50 mass %, relative to the total mass of the main agent. Furthermore, when the carbon black is compounded in the curing agent, the content of the carbon black is preferably from 3 to 80 mass %, and more preferably from 10 to 50 mass %, relative to the total mass of the curing agent.

Calcium Carbonate

In the adhesive composition of the present technology, at least one of the main agent or the curing agent described above preferably contains calcium carbonate.

The calcium carbonate can be a conventionally known calcium carbonate that is also used in a typical one-component polyurethane composition and may be heavy calcium carbonate, precipitated calcium carbonate (light calcium carbonate), colloidal calcium carbonate, or the like.

In the present technology, when the calcium carbonate is compounded in the main agent, the content of the calcium carbonate is preferably from 3 to 80 mass %, and more preferably from 5 to 50 mass %, relative to the total mass of the main agent. Furthermore, when the calcium carbonate is compounded in the curing agent, the content of the calcium carbonate is preferably from 3 to 90 mass %, and more preferably from 10 to 70 mass %, relative to the total mass of the curing agent.

Other Optional Component

The adhesive composition of the present technology may contain, if necessary, various additives, in a range that does not inhibit the object of the present technology, such as fillers other than carbon black and calcium carbonate, curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents.

The filler can be an organic or inorganic filler of any form. Specific examples thereof include fumed silica, calcined silica, precipitated silica, pulverized silica, molten silica; diatomaceous earth; iron oxide, zinc oxide, titanium oxide, barium oxide, magnesium oxide; magnesium carbonate, zinc carbonate; pagodite clay, kaolin clay, calcined clay; carbon black; fatty acid-treated products, resin acid-treated products, urethane compound-treated products, and fatty acid ester-treated products thereof; and the like. One type of these may be used alone or two or more types of these may be used in combination.

The curing catalyst is not particularly limited; however, specific examples thereof include carboxylic acids, such as 2-ethylhexanoic acid and oleic acid; phosphoric acids, such as polyphosphoric acid, ethyl acid phosphate, and butyl acid phosphate; bismuth catalysts, such as bismuth octylate; tin catalysts, such as dibutyltin dilaurate and dioctyltin dilaurate; tertiary amine catalysts, such as 1,4-diazabicyclo[2.2.2]octane and 2,4,6-tris(dimethylaminomethyl)phenol (e.g. DMP-30); and the like.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, butylene glycol adipate polyester, and the like. One type of these may be used alone or two or more types of these may be used in combination.

Specific examples of the anti-aging agent include compounds such as hindered phenol compounds and the like.

Specific examples of the antioxidant include butylhydroxytoluene (BHT), butylhydroxyanisole (BHA), and the like.

Specific examples of the pigment include inorganic pigments, such as titanium oxide, zinc oxide, ultramarine, iron red, lithopone, lead, cadmium, iron, cobalt, aluminum, hydrochlorides, and sulfates; organic pigments, such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments, and carbon black; and the like.

Specific examples of the thixotropic agent include Aerosil (manufactured by Nippon Aerosil), Disparlon (manufactured by Kusumoto Chemicals, Ltd.), and the like.

Specific examples of the adhesion promoter include phenol resins, rosin resins, xylene resins, and the like.

Specific examples of the flame retardant include chloroalkyl phosphates, dimethyl-methyl phosphates, bromine-phosphorus compounds, ammonium polyphosphates, neopentyl bromide-polyethers, brominated polyethers, and the like.

Specific examples of the antistatic agent include quaternary ammonium salts; hydrophilic compounds, such as polyglycols and ethylene oxide derivatives; and the like.

The method of producing the adhesive composition of the present technology is not particularly limited. For example, the adhesive composition can be prepared by a method in which the main agent containing the urethane prepolymer (A) and the like and the curing agent containing the compound having two or more active hydrogen groups in each molecule and the like are separately and sufficiently mixed in a nitrogen gas atmosphere.

Furthermore, in the present technology, the prepared main agent can be charged and stored in a container purged with a nitrogen gas or the like, and the prepared curing agent can be charged and stored in another container, and then preparation is performed by mixing the main agent and the curing agent sufficiently when the adhesive composition is used.

EXAMPLES

The present technology is described below in detail using examples but is in no way limited to these examples.

Synthesis of Urethane Prepolymer A-1

Urethane prepolymer A-1, in which the content of isocyanate group was 2.10%, was synthesized by mixing 700 g of polyoxypropylene diol (average molecular weight: 2000), 300 g of polyoxypropylene triol (average molecular weight: 3000), and 499 g of 4,4'-diisocyanate phenylmethane (molecular weight: 250) (NCO/OH=2.0 in this case), further adding 500 g of diisononyl phthalate, and stirring in a nitrogen gas stream at 80° C. for 12 hours to allow reaction to proceed.

Examples 1 to 7 and Comparative Examples 1 to 17

The main agent shown in the upper row of Table 1 below and the curing agent shown in the lower row of the same table were prepared by mixing the components shown in the same table in the composition (part by mass) shown in the same table using an agitator.

Thereafter, 100 g of the prepared main agent and 10 g of the curing agent were mixed to obtain an adhesive composition.

For the obtained adhesive compositions, adhesion was evaluated by the methods described below. The results are shown in Table 1.

Workability (viscosity)

For the main agent prepared as described above, the SOD viscosity was measured using a pressure viscometer (ASTM D 1092) in accordance with JASO M338-89. The viscosity was measured in a condition at the temperature of the main agent of 20° C. and 20 sec$^{-1}$.

The evaluation criteria of the viscosity are as follows. The main agent having a viscosity of less than 320 Pa·s was evaluated as "excellent", the main agent having a viscosity of 320 Pa·s or greater but less than 360 Pa·s was evaluated as "good", the main agent having a viscosity of 360 Pa·s or greater was evaluated as "marginal". Evaluations of "good" or better were passing grades. The results are shown in Table 1 below.

Adhesion

Shear Strength

Two pieces of adherends formed by subjecting one face of a substrate (width: 25 mm, length: 120 mm, thickness: 3 mm; short fiber GFPP K7000, manufactured by Prime Polymer Co., Ltd.) formed from an olefin resin to a flame treatment were prepared.

After the flame treatment, it was confirmed that the wettability on the surface of the resin was 45.0 mN/m or greater, using the Wetting Tension Test Mixture (manufactured by Wako Pure Chemical Industries, Ltd.).

The adhesive composition immediately after the preparation (mixing) was then applied to a surface of one adherend (the face on which the flame treatment was performed) in a manner that the thickness was 3 mm. Thereafter, the coated surface was adhered to a surface of another adherend (the face on which the flame treatment was performed) and compression-bonded to produce a test sample.

After the produced test sample was left in an environment at 23° C. and a relative humidity of 50% for 3 days, tensile test was performed at 23° C. in accordance with JIS K 6850:1999 at a tensile speed of 50 mm/min to measure the shear strength (MPa).

As a result of the measurement, the test sample having a shear strength of 3.1 MPa or greater was evaluated as "excellent", the test sample having a shear strength of 2.0 MPa or greater but less than 3.1 MPa was evaluated as "good", and the test sample having a shear strength of less than 2.0 MPa was evaluated as "poor". The results are shown in Table 1 below.

Failure State

For the test sample by which the shear strength was measured, failure state was visually observed.

The test sample having the proportion of the area that has undergone cohesive failure (CF) of the adhesive agent, among the area which was adhered by the adhesive agent of 90% or greater was evaluated as "excellent", of 75% or greater but less than 90% was evaluated as "good", or 60% or greater but less than 75% was evaluated as "marginal", and of less than 60% was evaluated as "poor". The results are shown in Table 1 below.

Note that, in Table 1 below, "CF value" indicates the proportion of cohesive failure, and "AF value" indicates the proportion of adhesive failure (interfacial failure). For example, "CF80AF20" indicates that the cohesive failure was 80% and the adhesive failure was 20%.

Heat Resistance

A test sample that was similar to the test sample used in evaluation of adhesion was produced, and the produced test sample was left in an environment at 23° C. and a relative humidity of 50% for 3 days. Thereafter, the test sample was left in an oven at 100° C. for 200 hours, and then similar evaluation as that of the adhesion described above was performed. The results are shown in Table 1 below.

TABLE 1

|  |  | Examples | | | |
| --- | --- | --- | --- | --- | --- |
|  |  | 1 | 2 | 3 | 4 |
| Main agent | Urethane prepolymer A-1 | 42.4 | 42.4 | 42.4 | 42.4 |
|  | Isocyanurate compound C1-1 |  |  |  |  |
|  | Isocyanurate compound C1-2 | 2 | 2 | 1.7 | 1.7 |
|  | Isocyanurate compound C2-1 |  |  |  |  |
|  | Isocyanurate compound C2-2 |  |  |  |  |
|  | (Meth)acrylate compound C3-1 |  |  |  |  |
|  | (Meth)acrylate compound C3-2 |  |  |  |  |
|  | Terpene compound 1 |  | 0.5 | 0.3 | 0.3 |
|  | Carbon black | 20.6 | 20.6 | 20.6 | 20.6 |
|  | Calcium carbonate 1 | 19.3 | 19.3 | 19.3 | 19.3 |
|  | Plasticizer | 15.4 | 15 | 15.5 | 15.5 |
|  | Catalyst | 0.2 | 0.2 | 0.2 | 0.2 |
|  | Total | 100 | 100 | 100 | 100 |
| Curing agent | Compound B1-1 | 24.6 | 24.6 | 24.6 | 24.6 |
|  | Compound B2-1 |  |  | 10 |  |
|  | Compound B3-1 |  |  |  |  |
|  | Compound B4-1 |  |  |  | 10 |
|  | Microparticles D-2 |  |  |  |  |
|  | Microparticles D-3 |  |  |  |  |
|  | Microparticles D-4 |  | 24.6 |  |  |
|  | Microparticles D-5 | 24.6 |  | 16.3 | 16.3 |
|  | (Meth)acrylate compound C3-2 |  |  |  |  |
|  | Terpene compound 2 |  | 1.7 |  |  |
|  | Plasticizer | 1.7 |  |  |  |

TABLE 1-continued

|  |  |  |  |  |  |
|---|---|---|---|---|---|
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
| Mixed ratio of main agent to curing agent (mass ratio) |  | 10/1 | 10/1 | 10/1 | 10/1 |
| Workability | Main agent viscosity | Excellent 280 | Good 320 | Excellent 310 | Excellent 310 |
| Adhesion | Shear strength | Good 3.0 MPa | Excellent 3.6 MPa | Excellent 3.4 MPa | Excellent 3.5 MPa |
|  | Failure state | Good CF85AF15 | Excellent CF100 | Excellent CF100 | Excellent CF100 |
| Heat resistance | Shear strength | Good 3.0 MPa | Excellent 3.7 MPa | Excellent 3.3 MPa | Excellent 3.4 MPa |
|  | Failure state | Good CF85AF15 | Excellent CF100 | Excellent CF90AF10 | Excellent CF90AF10 |

|  |  | Examples | | | Comparative Example |
|---|---|---|---|---|---|
|  |  | 5 | 6 | 7 | 1 |
| Main agent | Urethane prepolymer A-1 | 42.4 | 42.4 | 42.4 | 42.4 |
|  | Isocyanurate compound C1-1 |  |  |  |  |
|  | Isocyanurate compound C1-2 | 1.7 | 1.7 | 1.7 |  |
|  | Isocyanurate compound C2-1 |  |  |  |  |
|  | Isocyanurate compound C2-2 |  |  |  |  |
|  | (Meth)acrylate compound C3-1 |  |  |  |  |
|  | (Meth)acrylate compound C3-2 |  |  |  |  |
|  | Terpene compound 1 | 0.3 | 0.3 | 0.3 |  |
|  | Carbon black | 20.6 | 20.6 | 20.6 | 20.6 |
|  | Calcium carbonate 1 | 19.3 | 19.3 | 19.3 | 19.3 |
|  | Plasticizer | 15.5 | 15.5 | 15.5 | 17.4 |
|  | Catalyst | 0.2 | 0.2 | 0.2 | 0.2 |
|  | Total | 100 | 100 | 100 | 100 |
| Curing agent | Compound B1-1 | 24.6 | 24.6 | 24.6 | 49.2 |
|  | Compound B2-1 | 10 |  | 5 |  |
|  | Compound B3-1 |  | 10 | 5 |  |
|  | Compound B4-1 | 4 | 4 | 4 |  |
|  | Microparticles D-2 |  |  |  |  |
|  | Microparticles D-3 |  |  |  |  |
|  | Microparticles D-4 |  |  |  |  |
|  | Microparticles D-5 | 12.3 | 12.3 | 12.3 |  |
|  | (Meth)acrylate compound C3-2 |  |  |  |  |
|  | Terpene compound 2 |  |  |  |  |
|  | Plasticizer |  |  |  | 1.7 |
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
| Mixed ratio of main agent to curing agent (mass ratio) |  | 10/1 | 10/1 | 10/1 | 10/1 |
| Workability | Main agent viscosity | Excellent 310 | Excellent 310 | Excellent 310 | Excellent 300 |
| Adhesion | Shear strength | Excellent 3.3 MPa | Excellent 3.5 MPa | Excellent 3.7 MPa | Poor 1.9 MPa |
|  | Failure state | Excellent CF100 | Excellent CF100 | Excellent CF100 | Poor AF100 |
| Heat resistance | Shear strength | Excellent 3.1 MPa | Excellent 3.2 MPa | Excellent 3.5 MPa | Poor 0.9 MPa |
|  | Failure state | Excellent CF95AF5 | Excellent CF95AF5 | Excellent CF100 | Poor AF100 |

|  |  | Comparative Examples | | | |
|---|---|---|---|---|---|
|  |  | 2 | 3 | 4 | 5 |
| Main agent | Urethane prepolymer A-1 | 42.4 | 42.4 | 42.4 | 42.4 |

TABLE 1-continued

|  |  |  |  |  |  |
|---|---|---|---|---|---|
|  | Isocyanurate compound C1-1 | 2 |  | 1.7 | 1.7 |
|  | Isocyanurate compound C1-2 |  |  |  |  |
|  | Isocyanurate compound C2-1 |  |  |  |  |
|  | Isocyanurate compound C2-2 |  |  |  |  |
|  | (Meth)acrylate compound C3-1 |  |  |  |  |
|  | (Meth)acrylate compound C3-2 |  |  |  |  |
|  | Terpene compound 1 |  |  | 0.3 | 0.3 |
|  | Carbon black | 20.6 | 20.6 | 20.6 | 20.6 |
|  | Calcium carbonate 1 | 19.3 | 19.3 | 19.3 | 19.3 |
|  | Plasticizer | 15.5 | 17.4 | 15.5 | 15.5 |
|  | Catalyst | 0.2 | 0.2 | 0.2 | 0.2 |
|  | Total | 100 | 100 | 100 | 100 |
| Curing agent | Compound B1-1 | 49.2 | 24.6 | 45.9 | 40.9 |
|  | Compound B2-1 |  |  | 5 |  |
|  | Compound B3-1 |  |  |  | 10 |
|  | Compound B4-1 |  |  |  |  |
|  | Microparticles D-2 |  |  |  |  |
|  | Microparticles D-3 |  |  |  |  |
|  | Microparticles D-4 |  |  |  |  |
|  | Microparticles D-5 |  | 24.6 |  |  |
|  | (Meth)acrylate compound C3-2 |  |  |  |  |
|  | Terpene compound 2 |  |  |  |  |
|  | Plasticizer | 1.7 | 1.7 |  |  |
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
| Mixed ratio of main agent to curing agent (mass ratio) |  | 10/1 | 10/1 | 10/1 | 10/1 |
| Workability | Main agent viscosity | Marginal 390 | Excellent 300 | Marginal 370 | Marginal 370 |
| Adhesion | Shear strength | Good 2.4 MPa | Good 2.1 MPa | Excellent 3.5 MPa | Excellent 3.4 MPa |
|  | Failure state | Marginal CF60AF40 | Poor AF50CF50 | Excellent CF100 | Excellent CF95AF5 |
| Heat resistance | Shear strength | Poor 1.9 MPa | Poor 1.8 MPa | Excellent 3.1 MPa | Good 2.9 MPa |
|  | Failure state | Poor CF50AF50 | Poor CF30AF70 | Marginal CF70AF30 | Marginal CF70AF30 |

|  |  | Comparative Examples |  |  |  |
|---|---|---|---|---|---|
|  |  | 6 | 7 | 8 | 9 |
| Main agent | Urethane prepolymer A-1 | 42.4 | 42.4 | 42.4 | 42.4 |
|  | Isocyanurate compound C1-1 | 1.7 | 1.7 | 1.7 | 1.7 |
|  | Isocyanurate compound C1-2 |  |  |  |  |
|  | Isocyanurate compound C2-1 |  |  |  |  |
|  | Isocyanurate compound C2-2 |  |  |  |  |
|  | (Meth)acrylate compound C3-1 |  |  |  |  |
|  | (Meth)acrylate compound C3-2 |  |  |  |  |
|  | Terpene compound 1 | 0.3 | 0.3 | 0.3 | 0.3 |
|  | Carbon black | 20.6 | 20.6 | 20.6 | 20.6 |
|  | Calcium carbonate 1 | 19.3 | 19.3 | 19.3 | 19.3 |
|  | Plasticizer | 15.5 | 15.5 | 15.5 | 15.5 |
|  | Catalyst | 0.2 | 0.2 | 0.2 | 0.2 |
|  | Total | 100 | 100 | 100 | 100 |
| Curing agent | Compound B1-1 | 43.9 | 38.9 | 42.2 | 37.2 |
|  | Compound B2-1 | 5 |  | 5 |  |
|  | Compound B3-1 |  | 10 |  | 10 |

TABLE 1-continued

|  |  |  |  |  |  |
|---|---|---|---|---|---|
|  | Compound B4-1 | 2 | 2 | 2 | 2 |
|  | Microparticles D-2 |  |  |  |  |
|  | Microparticles D-3 |  |  |  |  |
|  | Microparticles D-4 |  |  |  |  |
|  | Microparticles D-5 |  |  |  |  |
|  | (Meth)acrylate compound C3-2 |  |  |  |  |
|  | Terpene compound 2 |  |  |  |  |
|  | Plasticizer |  |  | 1.7 | 1.7 |
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
|  | Mixed ratio of main agent to curing agent (mass ratio) | 10/1 | 10/1 | 10/1 | 10/1 |
| Workability | Main agent viscosity | Marginal 370 | Marginal 370 | Marginal 370 | Marginal 370 |
| Adhesion | Shear strength | Excellent 3.4 MPa | Excellent 3.2 MPa | Excellent 3.1 MPa | Excellent 3.1 MPa |
|  | Failure state | Excellent CF95AF5 | Excellent CF90AF10 | Good CF85AF15 | Good CF80AF20 |
| Heat resistance | Shear strength | Good 3.0 MPa | Good 2.7 MPa | Good 2.5 MPa | Good 2.2 MPa |
|  | Failure state | Marginal CF65AF35 | Marginal CF65AF35 | Marginal CF60AF40 | Marginal CF60AF40 |

|  |  | Comparative Examples | | | |
|---|---|---|---|---|---|
|  |  | 10 | 11 | 12 | 13 |
| Main agent | Urethane prepolymer A-1 | 42.4 | 42.4 | 42.4 | 42.4 |
|  | Isocyanurate compound C1-1 | 1.7 | 2 |  |  |
|  | Isocyanurate compound C1-2 |  |  |  |  |
|  | Isocyanurate compound C2-1 |  |  | 1.5 |  |
|  | Isocyanurate compound C2-2 |  |  |  | 1.5 |
|  | (Meth)acrylate compound C3-1 |  |  |  |  |
|  | (Meth)acrylate compound C3-2 |  |  |  |  |
|  | Terpene compound 1 | 0.3 |  |  |  |
|  | Carbon black | 20.6 | 20.6 | 20.6 | 20.6 |
|  | Calcium carbonate 1 | 19.3 | 19.3 | 19.3 | 19.3 |
|  | Plasticizer | 15.5 | 15.4 | 15.9 | 15.9 |
|  | Catalyst | 0.2 | 0.2 | 0.2 | 0.2 |
|  | Total | 100 | 100 | 100 | 100 |
| Curing agent | Compound B1-1 | 32.2 | 24.6 | 24.6 | 24.6 |
|  | Compound B2-1 | 5 |  |  |  |
|  | Compound B3-1 | 10 |  |  |  |
|  | Compound B4-1 | 2 |  |  |  |
|  | Microparticles D-2 |  |  |  |  |
|  | Microparticles D-3 |  |  |  |  |
|  | Microparticles D-4 |  |  |  |  |
|  | Microparticles D-5 |  | 24.6 | 24.6 | 24.6 |
|  | (Meth)acrylate compound C3-2 |  |  |  |  |
|  | Terpene compound 2 |  |  |  |  |
|  | Plasticizer | 1.7 | 1.7 | 1.7 | 1.7 |
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
|  | Mixed ratio of main agent to curing agent (mass ratio) | 10/1 | 10/1 | 10/1 | 10/1 |
| Workability | Main agent viscosity | Marginal 370 | Marginal 390 | Marginal 390 | Marginal 400 |
| Adhesion | Shear strength | Excellent 3.3 MPa | Good 2.9 MPa | Good 2.7 MPa | Good 2.5 MPa |
|  | Failure state | Excellent CF90AF10 | Good CF80AF20 | Good CF75AF25 | Good CF75AF25 |
| Heat resistance | Shear strength | Excellent 3.2 MPa | Good 2.8 MPa | Good 2.9 MPa | Good 2.9 MPa |
|  | Failure state | Marginal CF70AF30 | Good CF80AF20 | Good CF80CF20 | Good CF85CF15 |

TABLE 1-continued

|  |  | Comparative Examples | | | |
| --- | --- | --- | --- | --- | --- |
|  |  | 14 | 15 | 16 | 17 |
| Main agent | Urethane prepolymer A-1 | 42.4 | 42.4 | 42.4 | 42.4 |
|  | Isocyanurate compound C1-1 |  |  | 2 | 2 |
|  | Isocyanurate compound C1-2 |  |  |  |  |
|  | Isocyanurate compound C2-1 |  |  |  |  |
|  | Isocyanurate compound C2-2 |  |  |  |  |
|  | (Meth)acrylate compound C3-1 | 1.5 |  |  |  |
|  | (Meth)acrylate compound C3-2 |  | 1.5 |  |  |
|  | Terpene compound 1 |  |  |  |  |
|  | Carbon black | 20.6 | 20.6 | 20.6 | 20.6 |
|  | Calcium carbonate 1 | 19.3 | 19.3 | 19.3 | 19.3 |
|  | Plasticizer | 15.9 | 15.9 | 15.5 | 15.5 |
|  | Catalyst | 0.2 | 0.2 | 0.2 | 0.2 |
|  | Total | 100 | 100 | 100 | 100 |
| Curing agent | Compound B1-1 | 24.6 | 24.6 | 24.6 | 24.6 |
|  | Compound B2-1 |  |  |  |  |
|  | Compound B3-1 |  |  |  |  |
|  | Compound B4-1 |  |  |  |  |
|  | Microparticles D-2 |  |  | 24.6 |  |
|  | Microparticles D-3 |  |  |  | 24.6 |
|  | Microparticles D-4 |  |  |  |  |
|  | Microparticles D-5 | 24.6 | 24.6 |  |  |
|  | (Meth)acrylate compound C3-2 |  |  | 1.7 | 1.7 |
|  | Terpene compound 2 |  |  |  |  |
|  | Plasticizer | 1.7 | 1.7 |  |  |
|  | Calcium carbonate 2 | 48.8 | 48.8 | 48.8 | 48.8 |
|  | Catalyst | 0.3 | 0.3 | 0.3 | 0.3 |
|  | Total | 100 | 100 | 100 | 100 |
| Mixed ratio of main agent to curing agent (mass ratio) |  | 10/1 | 10/1 | 10/1 | 10/1 |
| Workability | Main agent viscosity | Marginal 380 | Marginal 390 | Marginal 390 | Marginal 390 |
| Adhesion | Shear strength | Good 2.3 MPa | Good 2.5 MPa | Good 2.4 MPa | Good 2.6 MPa |
|  | Failure state | Good CF75AF25 | Good CF75AF25 | Good CF80AF20 | Good CF75AF25 |
| Heat resistance | Shear strength | Good 2.6 MPa | Good 2.9 MPa | Good 2.5 MPa | Good 2.4 MPa |
|  | Failure state | Good CF75CF25 | Good CF75CF25 | Good CF75AF25 | Good CF75AF25 |

The details of each component shown in Table 1 above are as follows.

Urethane prepolymer A-1: Urethane prepolymer synthesized as described above

Microparticles D-2: Microparticles obtained by homogenizing 15 parts by mass of silica melamine composite microparticles (product number: Optbeads 500SL, manufactured by Nissan Chemical Industries, Ltd.; concentration of microparticles: 100 mass %; average particle diameter of microparticles: 0.6 μm; glass transition temperature of microparticle: 210° C.) and 100 parts by mass of polyoxypropylene triol (molecular weight: 5100) using a paint mill (S-43/4X11, manufactured by Inoue Mfg., Inc.)

Microparticles D-3: Microparticles obtained by homogenizing 15 parts by mass of polymethacrylic acid particles (product number: XX-2851Z, manufactured by Sekisui Plastics Co., Ltd.; concentration of microparticles: 100 mass %; average particle diameter of microparticles: 0.3 μm; glass transition temperature of microparticle: 100° C.) and 100 parts by mass of polyoxypropylene triol (molecular weight: 5100) using a paint mill (S-43/4X11, manufactured by Inoue Mfg., Inc.)

Microparticles D-4: A PPG solution in which microparticles formed from a copolymer of acrylonitrile and styrene were dispersed (product number: FL-557; concentration of microparticles: 40 mass %; average particle diameter of microparticles: 1.0 μm; glass transition temperature of microparticles: 100° C.; manufactured by Sanyo Chemical Industries, Ltd.)

Microparticles D-5: A PPG solution in which microparticles formed from a homopolymer of styrene were dispersed (product number: Excenol 910; concentration of microparticles: 20 mass %; average particle diameter of microparticles: 1 μm; glass transition temperature of microparticles: 110° C.; manufactured by Asahi Glass Co., Ltd.)

Isocyanurate compound C1-1: Isocyanurate of hexamethylene diisocyanate (Tolonate HDT, manufactured by Perstorp)

Isocyanurate compound C1-2: Isocyanurate of pentamethylene diisocyanate

Isocyanurate compound C2-1: Isocyanurate of isocyanatopropyltrimethoxysilane (Y-19020, manufactured by Momentive Performance Materials Inc.)

Isocyanurate compound C2-2: Isocyanurate of isocyanatopropyltriethoxysilane (A-1310, manufactured by Momentive Performance Materials Inc.)

(Meth)acrylate compound C3-1: Ethoxylated isocyanuric acid triacrylate (A-9300, manufactured by Shin-Nakamura Chemical Co., Ltd.)

(Meth)acrylate compound C3-2: ε-Caprolactone-modified tris(2-acryloxyethyl)isocyanurate (A-9300-1CL, manufactured by Shin-Nakamura Chemical Co., Ltd.)

Compound B1-1: Trifunctional polypropylene polyol (Excenol 1030, manufactured by Asahi Glass Co., Ltd.)

Compound B2-1: Polybutadiene diol (Poly bd R-45HT, manufactured by Idemitsu Kosan Co., Ltd.; hydroxyl value: 45)

Compound B3-1: Rosin diol (D-6011, manufactured by Arakawa Chemical Industries, Ltd.; hydroxyl value: 118)

Compound B4-1: Tetrafunctional polyether polyol (polyol 4800, manufactured by Perstorp; hydroxyl value: 800; molecular weight: 282)

Terpene compound 1: YS resin CP (manufactured by Yasuhara Chemical Co., Ltd.)

Terpene compound 2: Terpineol (manufactured by Yasuhara Chemical Co., Ltd.)

Carbon black: #200 MP (manufactured by NSCC Carbon Co., Ltd.)

Calcium carbonate 1: Super S (manufactured by Maruo Calcium Co., Ltd.)

Calcium carbonate 2: Kalfain 200 (manufactured by Maruo Calcium Co., Ltd.)

Plasticizer: Diisononyl phthalate (manufactured by J-PLUS Co., Ltd.)

Catalyst: Dimorpholinodiethyl ether (manufactured by San-Apro Ltd.)

As is clear from the results shown in Table 1 above, it was found that the adhesive composition which was prepared by blending no compound (C) having an isocyanurate ring and no microparticles (D) containing organic matter and having an average particle diameter of 0.1 to 10 µm exhibited poor adhesion and poor heat resistance (Comparative Example 1).

Furthermore, it was found that the adhesive composition which was prepared by blending no compound (C) having an isocyanurate ring or no microparticles (D) containing organic matter and having an average particle diameter of 0.1 to 10 µm exhibited insufficient adhesion and poor heat resistance (Comparative Examples 2 and 3).

It was found that the main agent obtained by using the compound (C) having an isocyanurate ring, except the isocyanurate of pentamethylene diisocyanate, had too high viscosity and made workability of the adhesive composition poor (Comparative Examples 2 and 4 to 17).

On the other hand, it was found that the adhesive composition which was prepared by blending the isocyanurate of pentamethylene diisocyanate as the compound (C) having an isocyanurate ring and the microparticles (D) containing organic matter and having an average particle diameter of 0.1 to 10 µm exhibited excellent adhesion and excellent heat resistance (Examples 1 to 7). Furthermore, it was found that, with the main agent obtained by using the compound (C) having an isocyanurate ring, except the isocyanurate of pentamethylene diisocyanate, increase in the viscosity was suppressed and workability of the adhesive composition became excellent. Note that, although it is not shown in Table 1, regarding the curing speed, after mixing the main agent and the curing agent, when the adhesive agent was bead-coated (diameter: 1 cm) at room temperature and, after 12 hours, cut using a box cutter, it was confirmed that the bead was cured from the surface layer to the inner portion in all of Examples and it was found that excellent curing speed as a two-component composition was sufficiently maintained.

Furthermore, from the comparisons of Examples, it was found that the adhesive composition prepared by compounding a terpene compound had better adhesion and better heat resistance compared to the case where no terpene compounds were compounded.

The invention claimed is:

1. A two-component urethane-based adhesive composition comprising:
    a main agent containing a urethane prepolymer (A) having an isocyanate group; and
    a curing agent containing a compound (B) having at least two active hydrogen-containing groups in each molecule;
    at least one of the main agent or the curing agent containing a compound (C) having an isocyanurate ring, and microparticles (D) containing organic matter and having an average particle diameter of 0.1 to 10 µm, wherein the microparticles (D) are polymers (D1) of a polymeric unsaturated group-containing monomer dispersed in a polyoxyalkylene polyol; and
    the compound (C) containing an isocyanurate of pentamethylene diisocyanate.

2. The two-component urethane-based adhesive composition according to claim 1, wherein the glass transition temperature of the polymer (D1) is 60° C. or higher.

3. The two-component urethane-based adhesive composition according to claim 1, wherein at least one of the main agent or the curing agent further contains a terpene compound (E).

4. The two-component urethane-based adhesive composition according to claim 2, wherein at least one of the main agent or the curing agent further contains a terpene compound (E).

* * * * *